United States Patent
Loeven, II et al.

(10) Patent No.: US 11,280,496 B2
(45) Date of Patent: Mar. 22, 2022

(54) GAS TURBINE ENGINE AND METHODS OF CONTROLLING EMISSIONS THEREFROM

(71) Applicant: General Electric Company, Schenectady, NY (US)

(72) Inventors: Robert Joseph Loeven, II, Simpsonville, SC (US); Haley Marie Boyd, Greer, SC (US); Jason Dean Fuller, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 69 days.

(21) Appl. No.: 16/829,728

(22) Filed: Mar. 25, 2020

(65) Prior Publication Data

US 2021/0302023 A1    Sep. 30, 2021

(51) Int. Cl.
| | |
|---|---|
| *F23R 3/34* | (2006.01) |
| *F02C 9/20* | (2006.01) |
| *F02C 9/28* | (2006.01) |
| *F02C 9/54* | (2006.01) |
| *F23R 3/26* | (2006.01) |
| *F02C 7/08* | (2006.01) |

(52) U.S. Cl.
CPC ............. *F23R 3/346* (2013.01); *F02C 9/20* (2013.01); *F02C 9/28* (2013.01); *F02C 9/54* (2013.01); *F23R 3/26* (2013.01); *F02C 7/08* (2013.01); *F05D 2270/31* (2013.01)

(58) Field of Classification Search
CPC ........ F05D 2270/31; F23R 3/26; F23R 3/346; F02C 9/20; F02C 9/28; F02C 9/54
See application file for complete search history.

(56) References Cited

U.S. PATENT DOCUMENTS

| | | | | |
|---|---|---|---|---|
| 5,042,245 | A | * | 8/1991 | Zickwolf, Jr. ...... F04D 27/0261 60/773 |
| 5,537,864 | A | | 7/1996 | Sood |
| 6,226,974 | B1 | | 5/2001 | Andrew et al. |
| 6,920,759 | B2 | | 7/2005 | Wakana et al. |
| 7,620,461 | B2 | | 11/2009 | Frederick et al. |

(Continued)

FOREIGN PATENT DOCUMENTS

| | | |
|---|---|---|
| EP | 1816327 A2 | 8/2007 |
| EP | 3477080 A1 | 5/2019 |

OTHER PUBLICATIONS

EPO Extended Search Report for Patent Application EP 21163565.1 dated Aug. 5, 2021; 8 pp.

*Primary Examiner* — William H Rodriguez
(74) *Attorney, Agent, or Firm* — Armstrong Teasdale LLP

(57) ABSTRACT

A gas turbine engine that includes a stage of guide vanes, a compressor downstream from the stage of guide vanes, and a combustor downstream from the compressor. The combustor includes a primary combustion zone and a secondary combustion zone downstream from the primary combustion zone. The primary combustion zone includes an exit configured to channel combustion gases towards the secondary combustion zone. A controller is communicatively coupled with the stage of guide vanes, the controller configured to monitor a temperature at the exit of the primary combustion zone, and selectively open and close the guide vanes to maintain the temperature within a predefined temperature range.

20 Claims, 3 Drawing Sheets

(56) References Cited

U.S. PATENT DOCUMENTS

| | | | | |
|---|---|---|---|---|
| 8,015,826 B2* | 9/2011 | Myers | ............... | F02C 9/18 |
| | | | | 60/785 |
| 8,065,022 B2 | 11/2011 | Minto et al. | | |
| 8,423,161 B2* | 4/2013 | Wilkes | ............... | G05B 17/02 |
| | | | | 700/31 |
| 9,494,086 B2 | 11/2016 | Pandey et al. | | |
| 9,790,834 B2 | 10/2017 | Miller et al. | | |
| 9,791,351 B2 | 10/2017 | Miller et al. | | |
| 9,909,508 B2 | 3/2018 | Jaiven et al. | | |
| 10,774,751 B2* | 9/2020 | Engler | ............... | F02C 9/52 |
| 2006/0220472 A1 | 10/2006 | Fecamp et al. | | |
| 2009/0063003 A1* | 3/2009 | Meadows | ............... | F02C 9/28 |
| | | | | 701/100 |
| 2014/0290264 A1* | 10/2014 | Hovel | ............... | F01K 23/10 |
| | | | | 60/772 |
| 2015/0377148 A1 | 12/2015 | Minto et al. | | |
| 2016/0146109 A1 | 5/2016 | Karpman et al. | | |
| 2017/0058784 A1* | 3/2017 | Vandale | ............... | F02C 9/18 |
| 2019/0234315 A1* | 8/2019 | Price | ............... | F02C 9/26 |
| 2021/0381432 A1* | 12/2021 | Leach | ............... | F02C 3/20 |
| 2021/0388775 A1* | 12/2021 | Thatcher | ............... | F02C 7/228 |

\* cited by examiner

GAS TURBINE ENGINE AND METHODS OF CONTROLLING EMISSIONS THEREFROM

BACKGROUND

The present disclosure relates generally to gas turbine engines and, more specifically, to systems and methods of controlling emissions from a gas turbine engine having axial fuel staging (AFS) multi-stage combustors.

Many known combustion turbine engines burn a fuel-air mixture in a combustor assembly to generate a combustion gas stream that is channeled to a turbine assembly. The turbine assembly converts the energy of the combustion gas stream to work that may be used to power a machine, such as an electric generator. Typically, when a turbine is operated at a relatively high load, the combustor exit temperature of the gas stream is high and carbon-monoxide (CO) and/or unburned hydrocarbon (UHC) emissions may be effectively controlled. However, when the combustion process is not fully completed, undesirable levels of CO and/or UHC may be present in the turbine exhaust system. In typical combustion turbine engines, the ability of the hydrocarbon fuel to completely combust at least partially based on a lower limit on the combustor exit temperature. As the turbine load decreases (often referred to as "turn down"), in many gas turbines it is necessary to reduce the combustor exit temperature, which may undesirably result in increased levels of CO and UHC being formed. Accordingly, it is desirable to maintain high combustor temperatures as a turbine engine reduces its load.

BRIEF DESCRIPTION

In one aspect, a gas turbine engine is provided. The gas turbine engine includes a stage of guide vanes, a compressor downstream from the stage of guide vanes, and a combustor downstream from the compressor. The combustor includes a primary combustion zone and a secondary combustion zone downstream from the primary combustion zone. The primary combustion zone includes an exit configured to channel combustion gases towards the secondary combustion zone. A controller is communicatively coupled to the stage of guide vanes, the controller configured to monitor a temperature at the exit of the primary combustion zone, and selectively open and close the guide vanes to facilitate maintaining the temperature within a predefined temperature range.

In another aspect, a gas turbine engine is provided. The gas turbine engine includes a stage of guide vanes, a compressor downstream from the stage of guide vanes, and a combustor downstream from the compressor. The combustor includes a primary combustion zone and a secondary combustion zone downstream from the primary combustion zone. The primary combustion zone includes an exit configured to channel combustion gases towards the secondary combustion zone. A controller is communicatively coupled to the stage of guide vanes, the controller configured to monitor a temperature at the exit of the primary combustion zone, determine a combustion mode in which the combustor is operating, and selectively open and close the guide vanes to facilitate maintaining the temperature at a temperature threshold associated with the combustion mode in which the combustor is operating.

In yet another aspect, a method of controlling emissions from a gas turbine engine that includes a compressor and a combustor is provided. The method includes monitoring a temperature within the combustor of the gas turbine engine, wherein the combustor includes a primary combustion zone and a secondary combustion zone downstream from the primary combustion zone, the temperature monitored at an exit of the primary combustion zone. The method also includes determining a combustion mode in which the combustor is operating, and selectively opening and closing guide vanes upstream of the compressor to facilitate maintaining the temperature at a temperature threshold associated with the combustion mode in which the combustor is operating.

DETAILED DESCRIPTION

The embodiments described herein relate to systems and methods of controlling emissions from a gas turbine engine having axial fuel staging (AFS) multi-stage combustors. For example, the emissions may be controlled by modulating the inlet guide vanes or variable guide vanes on the compressor of the gas turbine engine, thereby modulating airflow into the multi-stage combustor. Modulating the airflow facilitates controlling the intra-stage temperature of the multi-stage combustor, which is a significant factor in emissions control. In the exemplary embodiment, the selective positioning of the guide vanes is controlled automatically by a Proportional-Integral (PI) controller. A detailed physics-based model for the gas turbine engine is used to calculate and/or estimate a temperature at an exit of a primary combustion zone of the multi-stage combustor, and this determined temperature is provided to the closed loop controller. Accordingly, a desired exit temperature may be dynamically enforced by modulating the guide vanes. The desired exit temperature may be a constant value, or may be varied in accordance with a schedule that corresponds to physical conditions within the combustor. Controlling and maintaining the desired temperature within a predefined range facilitates enhancing emissions control, such as when the gas turbine engine is in a transient operational state. In addition, selective modulation of the guide vanes may be used to operate the combustor at reduced temperatures for reducing thermal strain on the combustion system and increasing part life.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
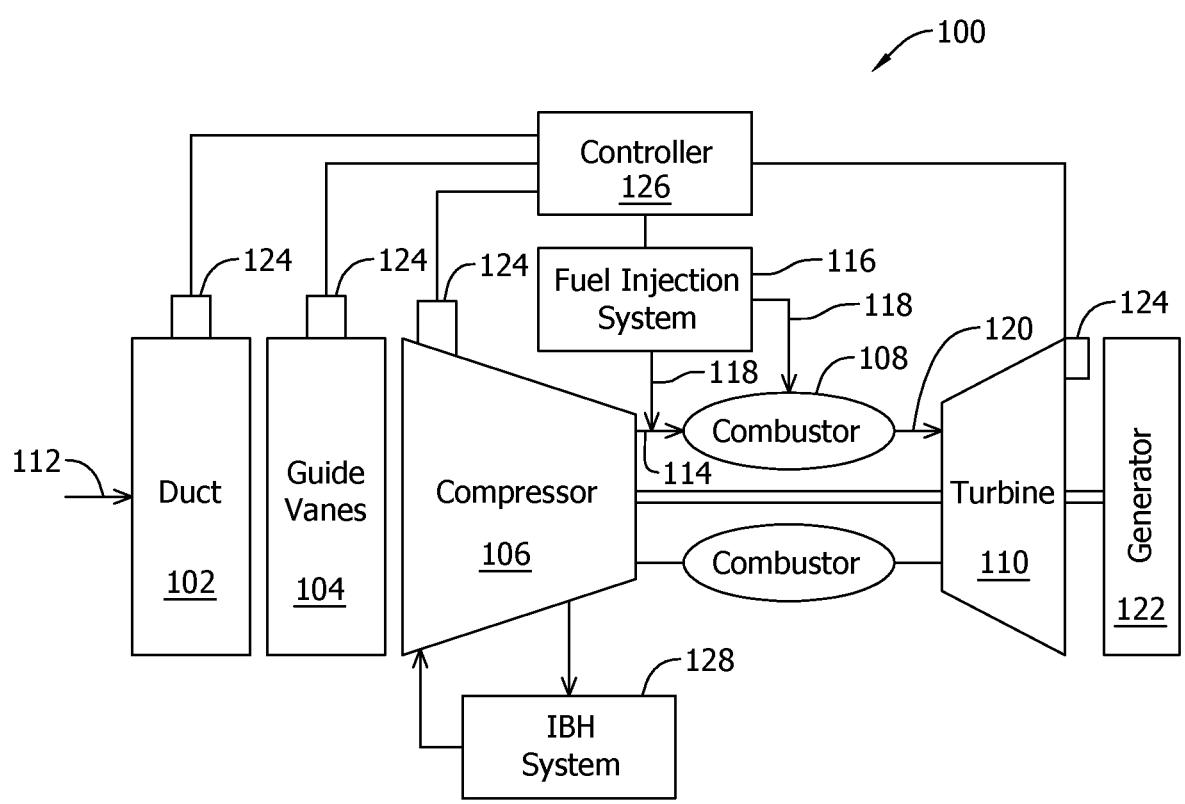
FIG. 1 is a schematic illustration of an exemplary gas turbine engine.

FIG. 1 is a schematic illustration of an exemplary gas turbine engine 100. In the exemplary embodiment, gas turbine engine 100 includes an inlet duct 102, a stage 104 of guide vanes, a compressor 106, a combustor 108, and a turbine section 110 coupled in a serial flow relationship. Intake air 112 is channeled through duct 102 and through stage 104 of guide vanes, prior to it being directed towards compressor 106. Compressor 106 compresses intake air 112 and discharges compressed air 114 towards combustor 108. A fuel injection system 116 provides fuel 118 to combustor 108, and the resulting fuel-air mixture is ignited within combustor 108. Combustion gas 120 is discharged from combustor 108 and is directed towards turbine section 110 where the thermal energy of combustion gas 120 is converted to work. A portion of the work is used to drive compressor 106, and the remaining balance is used to drive an electric generator 122 to generate electric power.

In the exemplary embodiment, gas turbine engine 100 includes multiple sensors 124 for detecting various conditions of the gas turbine engine 100, generator 122, and the ambient environment. Example sensors 124 include temperature sensors, pressure sensors, and the like. Temperature sensors may monitor compressor discharge temperature, turbine exhaust gas temperature, and/or other temperature measurements of the gas stream through gas turbine engine 100. Pressure sensors may monitor static and dynamic pressure levels at the compressor inlet and outlet, the turbine exhaust, and/or at other locations within gas turbine engine 100. Sensors 124 may also include, but is not limited to including, flow sensors, speed sensors, flame detector sensors, valve position sensors, guide vane angle sensors, and the like, that sense various parameters pertinent to the operation of gas turbine engine 100. Typically, pressure, temperature, flow, speed, guide vane angle and many other sensors on a gas turbine are reliable, require infrequent calibration and maintenance, and are relatively inexpensive. However, it is generally difficult to directly monitor combustion gas or combustor discharge temperatures, such as with a thermocouple, due to the harsh characteristics of the combustion gas. As described above, combustor temperature is a significant factor in emissions control.

In the exemplary embodiment, a controller 126 receives feedback transmitted from sensors 124 and controls operation of gas turbine engine 100 based on the feedback. Controller 126 may be a computer system having a processor(s) that executes programs to control the operation of gas turbine engine 100. The operation may be controlled using sensor feedback, instructions from human operators, and/or combustor temperature estimates that may be determined based on the sensor feedback. In one embodiment, controller 126 estimates and/or calculates the combustion gas or combustor discharge temperatures using a physics-based model that receives the sensor feedback as inputs. The combustion gas or combustor discharge temperatures estimates may be based on at least an airflow output from compressor 106, a fuel flow input to combustor 108, and/or an operational status of an inlet bleed heat (IBH) system 128. The airflow output from compressor 106 is dependent at least partially on the angle of the guide vanes in stage 104 that regulate airflow into compressor 106.

In combustion systems having a single combustion stage, the model assumed that all fuel was burned in a single combustion chamber. With axial fuel staging, the current model uses valve position and fuel pressure data to determine fuel flows, and thus a ratio between the primary and secondary combustion fuel flows. Therefore, a certain percentage of the fuel is burnt in the first combustion chamber with a first determined airflow, and the remaining percentage of the fuel is now modeled to be burnt in the second combustion chamber with a second determined airflow. The second determined airflow may include some additional airflow (such as cooling flows) which are provided to the second combustion chamber without passing through the first combustion chamber.

In operation, controller 126 regulates total fuel flow, the relative position of inlet guide vanes (or alternatively and/or additionally variable guide vanes within compressor 106), the operational status of IBH system 128 (i.e., airflow extraction rate from compressor 106), and combustor fuel splits to achieve a desired cycle match point (i.e., to generate a desired power output and heat-rate while observing operational boundaries). Total fuel flow and guide vane position are significant factors in achieving the desired result. A typical partial load or transient status control mode includes setting the fuel flow and the guide vane angles to satisfy a load (generator output) request, while monitoring an exhaust temperature profile (temperature control curve). When base load or steady state operation is achieved, the guide vanes are typically positioned at their angle of maximum physical limit for channeling airflow therethrough. At base load, fuel flow regulation and combustion splits are generally adjusted to achieve an exhaust temperature profile needed to satisfy emission limits and other gas turbine operating limits.

For example, controller 126 is selectively operable to maintain the NOx and CO emissions in the turbine exhaust to within certain predefined limits, and to maintain the combustor temperature to within predefined temperature ranges. The predefined temperature ranges may be based on current physical conditions within the combustor. For example, controller 126 may selectively control various parameters of gas turbine engine 100, including those described above, to maintain an estimated combustion gas or combustor discharge temperature within one of a plurality of predefined temperature ranges. Predefined values of physical conditions, or a ranges of predefined values, may correspond to a respective predefined temperature range. In addition, combustor 108 is operable in one of a plurality of combustion modes based on the current physical conditions of gas turbine engine 100. Maintaining the combustor temperature within the respective predefined temperature ranges enables combustor 108 to operate in a combustion mode for producing a reduced dynamic response and reduced emissions for the current physical conditions of gas turbine engine 100. When gas turbine engine 100 is in a startup or turn-down transient operating mode, controller 126 may be operable to dynamically adjust the combustion temperature accordingly.

In the exemplary embodiment, a combination of compressor discharge pressure and temperature at the exit of a primary combustion zone, as will be described in more detail below, is used to initiate mode transfers. For example, as a turbine load is increased, the exit temperature will be controlled by opening the guide vanes, which increases compressor discharge pressure. When a compressor discharge pressure threshold is met, transfer to a higher combustion mode is initiated, and the turbine loading is controlled based on a new exit temperature value. As a turbine load is reduced, the guide vanes will be closed and the exit temperature will begin to drop, thereby initiating transfer to a lower combustion mode. In alternative embodiments, opening and closing of the guide vanes for exit temperature control may be used in some, but not all, combustion modes.

For example, it may be desirable to control the exit temperature for combustion modes that are active in the bottom 50 percent of the load range of gas turbine engine 100. IBH system 128 may also be used to manipulate the cycle conditions of the combustor and the exit temperature from the primary combustion zone. For example, as a turbine load is reduced, the IBH system 128 may be selectively activated to modify the compressor discharge pressure, thereby providing another form of control for maintaining a desired exit temperature from the primary combustion zone.

Figure 2:
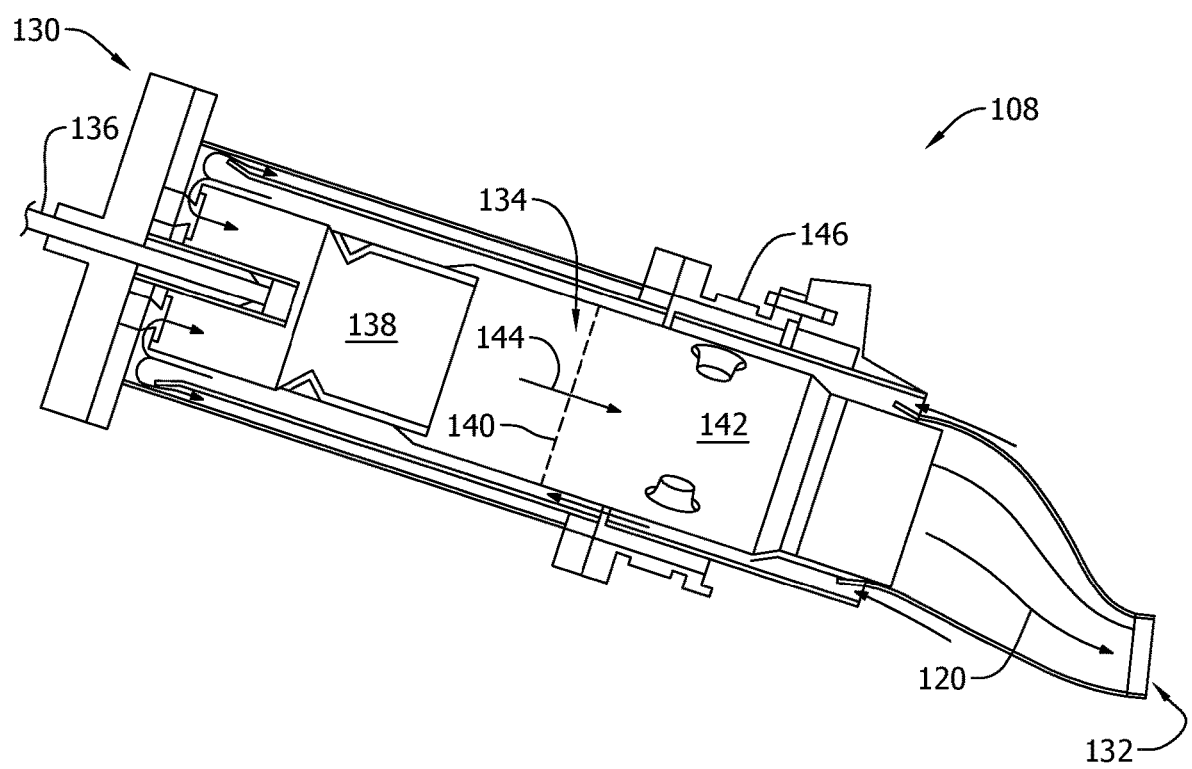
FIG. 2 is a cross-sectional illustration of an exemplary combustor that may be used in the gas turbine engine shown in FIG. 1.

FIG. 2 is a schematic illustration of an exemplary combustor 108. In the exemplary embodiment, combustor 108 includes a head end 130, a discharge end 132, and a combustion chamber 134 defined therebetween. Head end 130 includes a primary fuel injector 136 for supplying fuel to combustion chamber 134 from fuel injection system 116. The fuel is mixed with air from compressor 106 (shown in FIG. 1), and the fuel-air mixture is combusted in a primary combustion zone 138. In the exemplary embodiment, primary combustion zone 138 includes an exit 140 that defines a boundary between primary combustion zone 138 and a secondary combustion zone 142. Combustion gas 144 is discharged from primary combustion zone 138 through exit 140, and is channeled into secondary combustion zone 142.

Within secondary combustion zone 142, combustor 108 includes a plurality of secondary (i.e., axial fuel staging (AFS)) injectors spaced circumferentially about combustor 108, and oriented radially relative to an axis of combustion chamber 134. Secondary fuel injectors 146 provide fuel from fuel injection system 116 for mixing with combustion gas 144. The additional fuel is combusted within secondary combustion zone 142, and combustion gas 120 is discharged from discharge end 132.

In some embodiments, the additional fuel injected into zone 142 may be provided from a secondary fuel supply, in which case the secondary fuel or fuels may be different from and more volatile than the fuel provided to primary combustion zone 138 (e.g., any suitable gaseous or liquid fuel, such as, but not limited to, natural gas, liquefied natural gas (LNG), syngas, associated petroleum gas, methane, ethane, butane propane, biogas, sewage gas, landfill gas, coal mine gas, gasoline, diesel, naphtha, kerosene, methanol, biofuel, and/or any combination thereof). In some embodiments, the secondary fuel may be the same fuel as the primary fuel. Providing fuel to both primary combustion zone 138 and secondary combustion zone 142 facilitates enabling a more complete combustion to be achieved, which may facilitate reducing certain emissions (e.g., NOx emissions) discharged from gas turbine engine 100.

As described above, maintaining the combustor temperature within a respective predefined temperature range enables combustor 108 to operate in a combustion mode while producing a reduced dynamic response and with reduced emissions for the current physical conditions of gas turbine engine 100 (shown in FIG. 1). In the exemplary embodiment, controller 126 continuously calculates (i.e., monitors) the temperature at exit 140 of primary combustion zone 138, determines a combustion mode in which combustor 108 is operating, and controls actuation of stage 104 of guide vanes to facilitate maintaining the monitored temperature within the respective predefined temperature range associated with the determined combustion mode. Controlling actuation of the guide vanes regulates airflow provided to and/or channeled through compressor 106, and thus regulates airflow provided to combustor 108. Reducing airflow to combustor 108 generally increases combustor temperature, and increasing airflow to combustor 108 generally reduces combustor temperature, when fuel supply remains constant.

Each respective predefined temperature range is defined by a minimum temperature threshold and a maximum temperature threshold. In general, emissions are facilitated to be reduced at higher combustion temperatures. Accordingly, in one embodiment, controller 126 controls actuation of the guide vanes to maintain the monitored temperature at or near the maximum temperature threshold of the respective predefined temperature range. In other words, the guide vanes are controlled to maintain the monitored temperature closer to the maximum temperature threshold than the minimum temperature threshold. Alternatively, the guide vanes are controlled to main the monitored temperature at a desired temperature threshold within the predefined temperature range to obtain desired emissions or dynamics characteristics.

Figure 3:
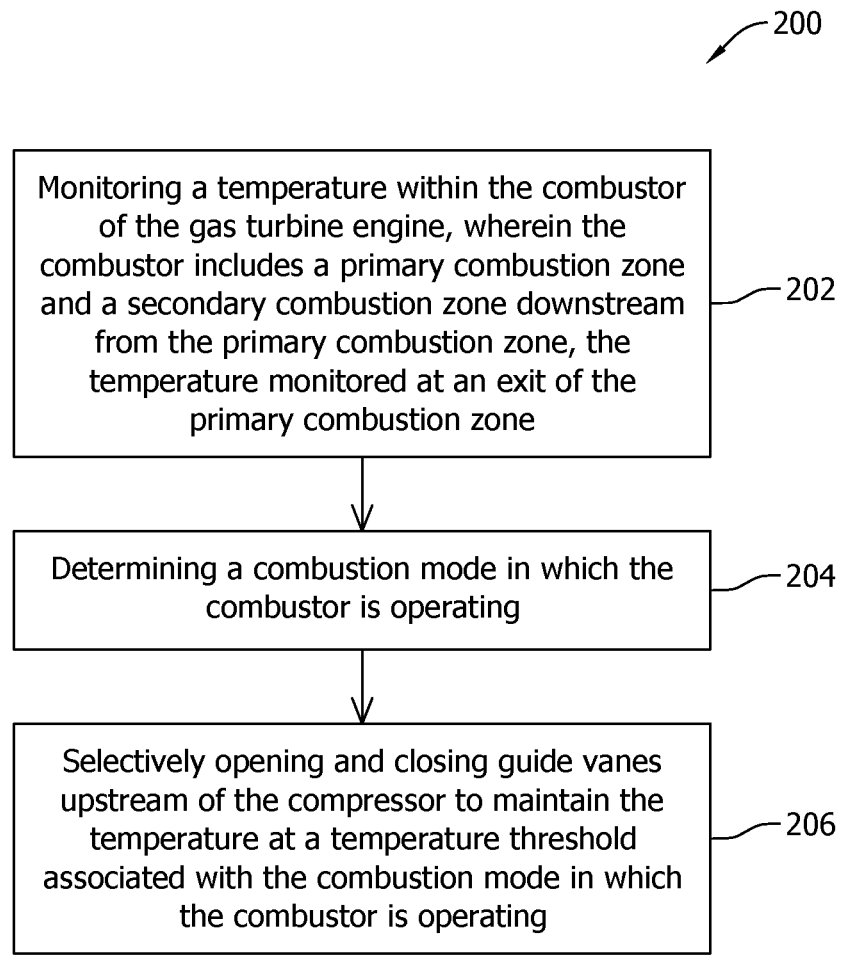
FIG. 3 is a flow diagram illustrating an exemplary method of controlling emissions from a gas turbine engine.

FIG. 3 is a flow diagram illustrating an exemplary method 200 of controlling emissions from a gas turbine engine. Method 200 includes monitoring 202 a temperature within the combustor of the gas turbine engine, wherein the combustor includes a primary combustion zone and a secondary combustion zone downstream from the primary combustion zone, the temperature monitored at an exit of the primary combustion zone. Method 200 also includes determining 204 a combustion mode in which the combustor is operating, and selectively opening and closing 206 guide vanes upstream of the compressor to maintain the temperature at a temperature threshold associated with the combustion mode in which the combustor is operating.

The embodiments described herein relate to systems and methods of controlling emissions from a gas turbine engine. The emissions are controlled by monitoring and dynamically enforcing an exit temperature of a primary combustion zone in a multi-stage combustor by controlling airflow into the combustor via guide vane control. Accordingly, the systems and methods described herein facilitate providing better emissions control, lower turn down, and reduced thermal strain on hot gas path components.

The above description is meant to be exemplary only, and one skilled in the art will recognize that changes may be made to the embodiments described without departing from the scope of the invention disclosed. For example, the process steps described herein may be modified in duration, temperature, or time between cycles, for example. Still other modifications, which fall within the scope of the present invention, will be apparent to those skilled in the art, in light of a review of this disclosure, and such modifications are intended to fall within the appended claims.

Exemplary embodiments of systems and methods of controlling emissions from a gas turbine engine thereof are described above in detail. The methods are not limited to the specific embodiments described herein, but rather, steps of the methods may be utilized independently and separately from other steps described herein. For example, the methods described herein are not limited to practice with industrial gas turbine engines as described herein. Rather, the exemplary embodiment can be implemented and utilized in connection with many other applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A gas turbine engine comprising:
a stage of guide vanes;
a compressor downstream from the stage of guide vanes;
a combustor downstream from the compressor, the combustor comprising
a primary combustion zone that combusts a first percentage of fuel; and
a secondary combustion zone that combusts a second percentage of fuel, downstream from the primary combustion zone, wherein the primary combustion zone comprises an exit that defines a boundary between the primary combustion zone and the secondary combustion zone, the exit is configured to channel combustion gases exiting the primary combustion zone towards the secondary combustion zone; and
a controller communicatively coupled to the stage of guide vanes, the controller configured to:
monitor a temperature at the exit of the primary combustion zone; and
selectively open and close the guide vanes to facilitate maintaining the temperature within a predefined temperature range.

2. The gas turbine engine in accordance with claim 1, wherein the combustor is operable in a plurality of combustion modes, the controller further configured to facilitate maintaining the temperature within a respective predefined temperature range that is associated with each combustion mode.

3. The gas turbine engine in accordance with claim 2, wherein each respective predefined temperature range is defined by a respective maximum temperature threshold, the controller further configured to selectively open and close the guide vanes to maintain the temperature at the respective maximum temperature threshold.

4. The gas turbine engine in accordance with claim 1, wherein the controller is configured to calculate the temperature at the exit of the primary combustion zone.

5. The gas turbine engine in accordance with claim 4, wherein the controller is further configured to calculate the temperature based on an airflow output from the compressor, a fuel flow input to the combustor, and an operational status of an inlet bleed heat system.

6. The gas turbine engine in accordance with claim 4, wherein the controller is further configured to calculate the temperature using a physics-based model.

7. The gas turbine engine in accordance with claim 1 further comprising a fuel injection system comprising a primary fuel injector configured to provide fuel to the primary combustion zone, and a secondary fuel injector configured to provide fuel to the secondary combustion zone.

8. The gas turbine engine in accordance with claim 1, wherein the controller comprises at least one of a Proportional controller or a Proportional-Integral (PI) controller.

9. A gas turbine engine comprising:
a stage of guide vanes;
a compressor downstream from the stage of guide vanes;
a combustor downstream from the compressor, the combustor comprising
a primary combustion zone that combusts a first percentage of fuel; and
a secondary combustion zone that combusts a second percentage of fuel, downstream from the primary combustion zone, wherein the primary combustion zone comprises an exit that defines a boundary between the primary combustion zone and the secondary combustion zone, the exit is configured to channel combustion gases exiting the primary combustion zone towards the secondary combustion zone, wherein the combustor is operable in a plurality of combustion modes; and
a controller communicatively coupled to the stage of guide vanes, the controller configured to:
monitor a temperature at the exit of the primary combustion zone;
determine a combustion mode in which the combustor is operating; and
selectively open and close the guide vanes to facilitate maintaining the temperature at a temperature threshold associated with the combustion mode in which the combustor is operating.

10. The gas turbine engine in accordance with claim 9, wherein the combustor is operable in a plurality of combustion modes, the controller further configured to facilitate maintaining the temperature within a respective predefined temperature range that is associated with each combustion mode.

11. The gas turbine engine in accordance with claim 9, wherein the controller is further configured to calculate the temperature at the exit of the primary combustion zone.

12. The gas turbine engine in accordance with claim 11, wherein the controller is further configured to calculate the temperature based on an airflow output from the compressor, a fuel flow input to the combustor, and an operational status of an inlet bleed heat system.

13. The gas turbine engine in accordance with claim 9 further comprising a fuel injection system comprising a primary fuel injector configured to provide fuel to the primary combustion zone, and a secondary fuel injector configured to provide fuel to the secondary combustion zone.

14. The gas turbine engine in accordance with claim 9, wherein the controller comprises at least one of a Proportional controller or a Proportional-Integral (PI) controller.

15. A method of controlling emissions from a gas turbine engine that includes a compressor and a combustor, the method comprising:
monitoring a temperature within the combustor of the gas turbine engine, wherein the combustor includes a primary combustion zone that combusts a first percentage of fuel and a secondary combustion zone that combusts a second percentage of fuel, downstream from the primary combustion zone, the temperature monitored at an exit that defines a boundary between the primary combustion zone and the secondary combustion zone;
determining a combustion mode in which the combustor is operating; and
selectively opening and closing guide vanes upstream of the compressor to facilitate maintaining the temperature at a temperature threshold associated with the combustion mode in which the combustor is operating.

16. The method in accordance with claim 15, wherein determining a combustion mode comprises determining the combustion mode based on physical conditions within the combustor.

17. The method in accordance with claim 16, wherein monitoring a temperature comprises calculating the temperature based on an airflow output from the compressor, a fuel flow input to the combustor, and an operational status of an inlet bleed heat system.

18. The method in accordance with claim 16, wherein the combustor is operable in a plurality of combustion modes, the method further comprising maintaining the temperature within a respective predefined temperature range that is associated with each combustion mode.

19. The method in accordance with claim 15 further comprising controlling operation of the guide vanes with at least one of a Proportional controller or a Proportional-Integral (PI) controller.

20. The method in accordance with claim 15, further comprising controlling operation of an inlet bleed heat system to facilitate maintaining the temperature at the desired temperature threshold.

* * * * *